No. 668,754. Patented Feb. 26, 1901.
C. KOEGEL.
SLITTING AND WINDING MACHINE.
(Application filed Nov. 11, 1897.)

(No Model.) 6 Sheets—Sheet 1.

Witnesses
R. H. Newman
S. Sweeney

Inventor
Charles Koegel
By Allen Webster
Attorney

No. 668,754. Patented Feb. 26, 1901.
C. KOEGEL.
SLITTING AND WINDING MACHINE.
(Application filed Nov. 11, 1897.)
(No Model.) 6 Sheets—Sheet 2.

Witnesses
R. H. Newman
P. Sweeney

Inventor
Charles Koegel
By Allen Webster
Attorney

No. 668,754. Patented Feb. 26, 1901.
C. KOEGEL.
SLITTING AND WINDING MACHINE.
(Application filed Nov. 11, 1897.)
(No Model.) 6 Sheets—Sheet 3.

Witnesses
R. H. Newman
S. Sweeney

Inventor
Charles Koegel
By Allen Webster
Attorney

THE NORRIS PETERS CO., PHOTO-LITHO., WASHINGTON, D. C.

No. 668,754. Patented Feb. 26, 1901.
C. KOEGEL.
SLITTING AND WINDING MACHINE.
(Application filed Nov. 11, 1897.)
(No Model.) 6 Sheets—Sheet 4.
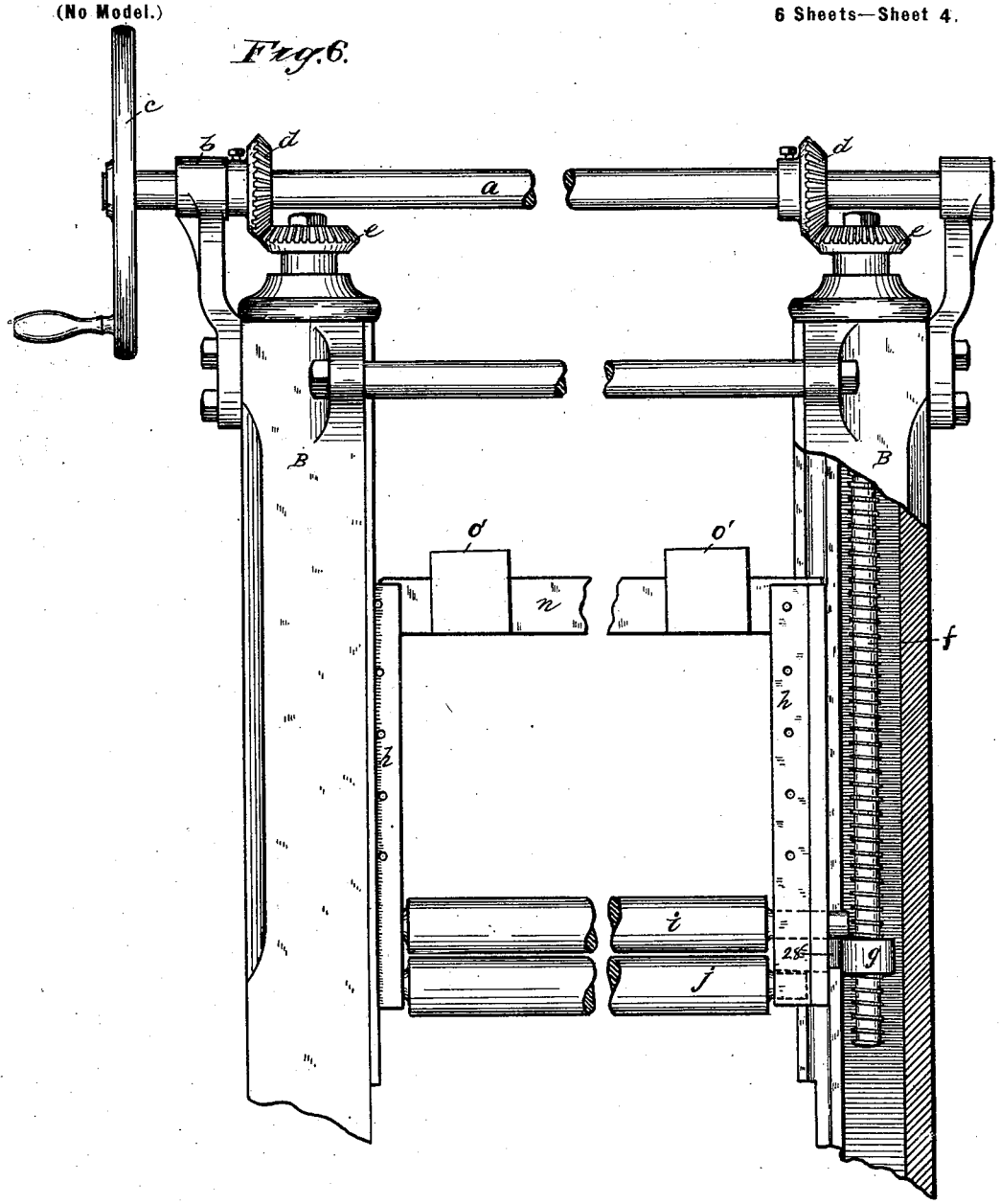
Witnesses
R. H. Newman
S. Sweeney
Inventor
Charles Koegel
By Allen Webster
Attorney

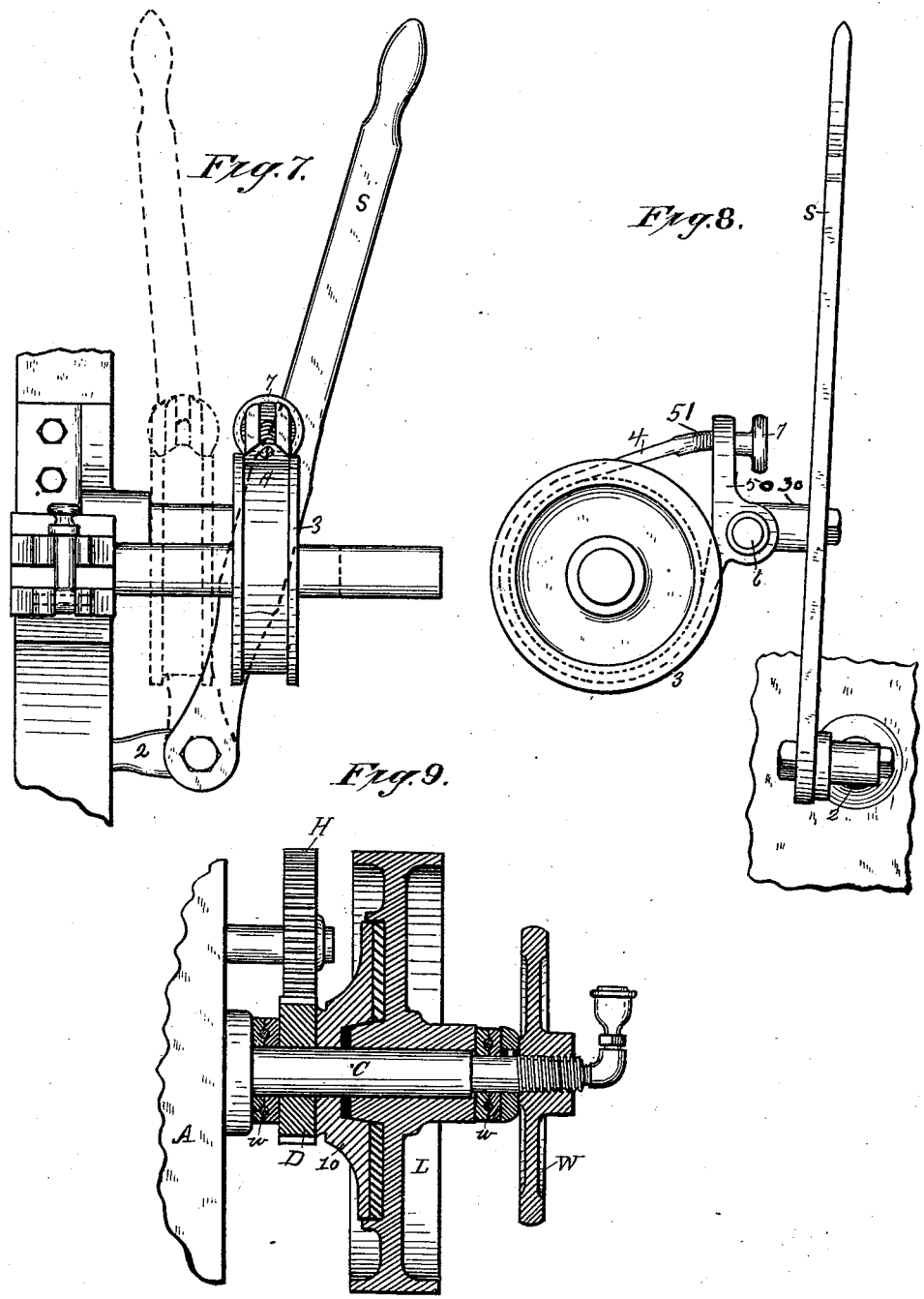

No. 668,754. Patented Feb. 26, 1901.
C. KOEGEL.
SLITTING AND WINDING MACHINE.
(Application filed Nov. 11, 1897.)
(No Model.) 6 Sheets—Sheet 6.
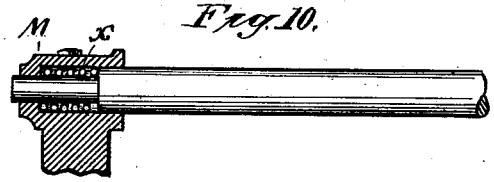
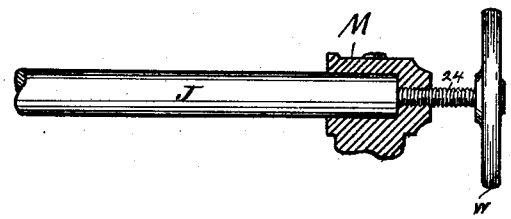
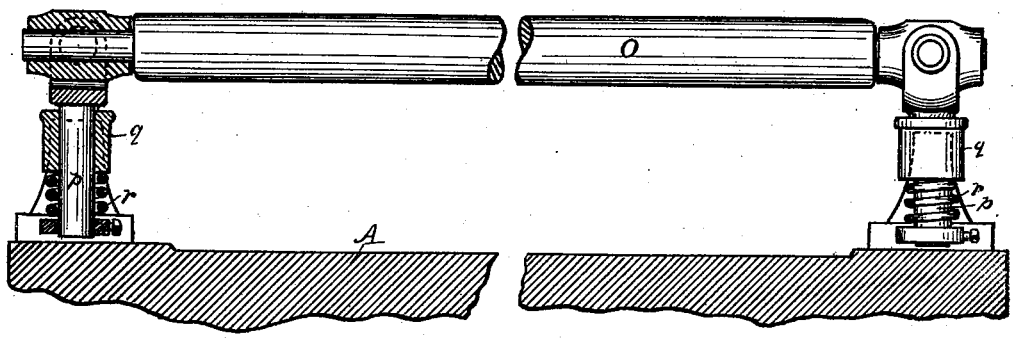
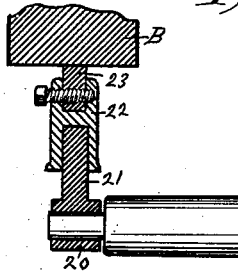
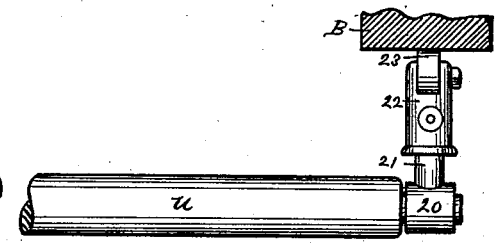
Witnesses
R. H. Newman
S. Sweeney
Inventor
Charles Koegel
By Allen Webster
Attorney

UNITED STATES PATENT OFFICE.

CHARLES KOEGEL, OF HOLYOKE, MASSACHUSETTS.

SLITTING AND WINDING MACHINE.

SPECIFICATION forming part of Letters Patent No. 668,754, dated February 26, 1901.

Application filed November 11, 1897. Serial No. 658,120. (No model.)

*To all whom it may concern:*

Be it known that I, CHARLES KOEGEL, a citizen of the United States of America, residing in Holyoke, in the county of Hampden and State of Massachusetts, have invented new and useful Improvements in Winding, Compressing, and Slitting Machines, of which the following is a specification, reference being had to the accompanying drawings and letters and figures of reference marked thereon.

The object of my invention is to produce a machine by which paper or other suitable material may be closely wound and formed into a thoroughly-compact mass and with which the material may be cut during the process of rolling and compacting, this producing, if desired, a series of rolls of uniform size and formed with smooth and accurate sides and very compact.

I accomplish the objects of my invention by the construction herein shown.

Figure 1:
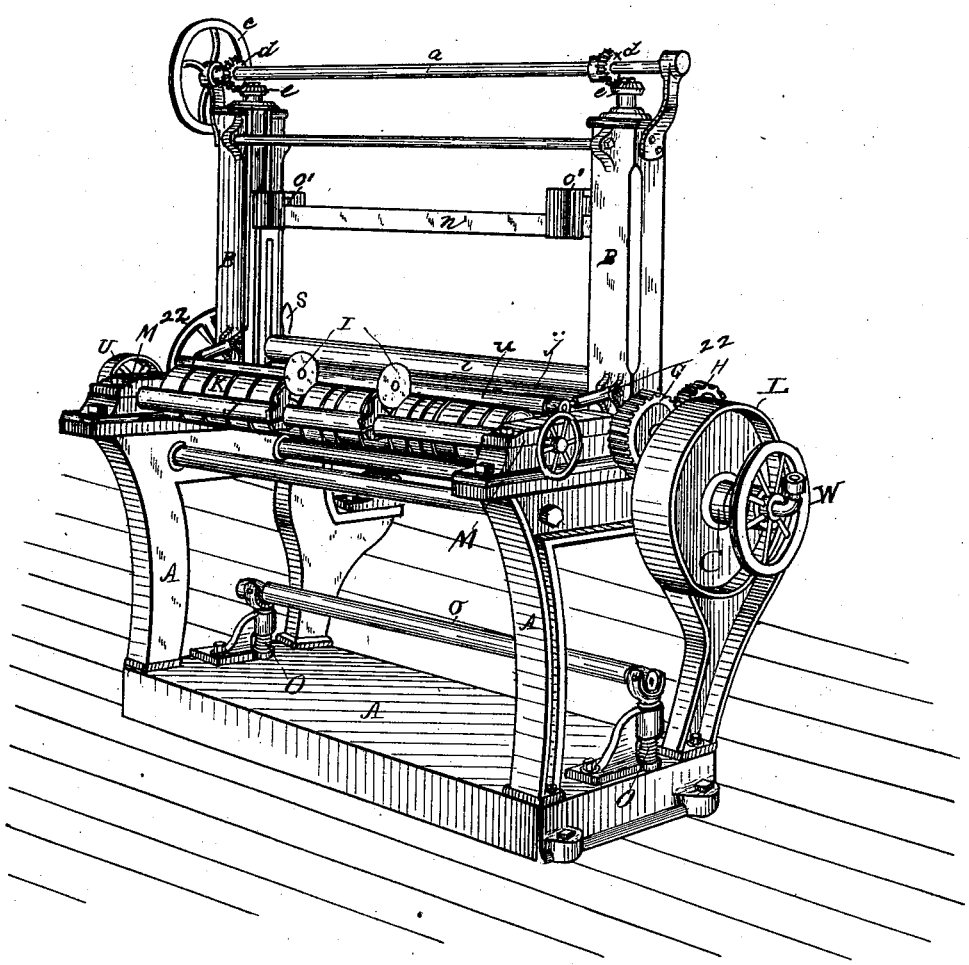
Figure 2:
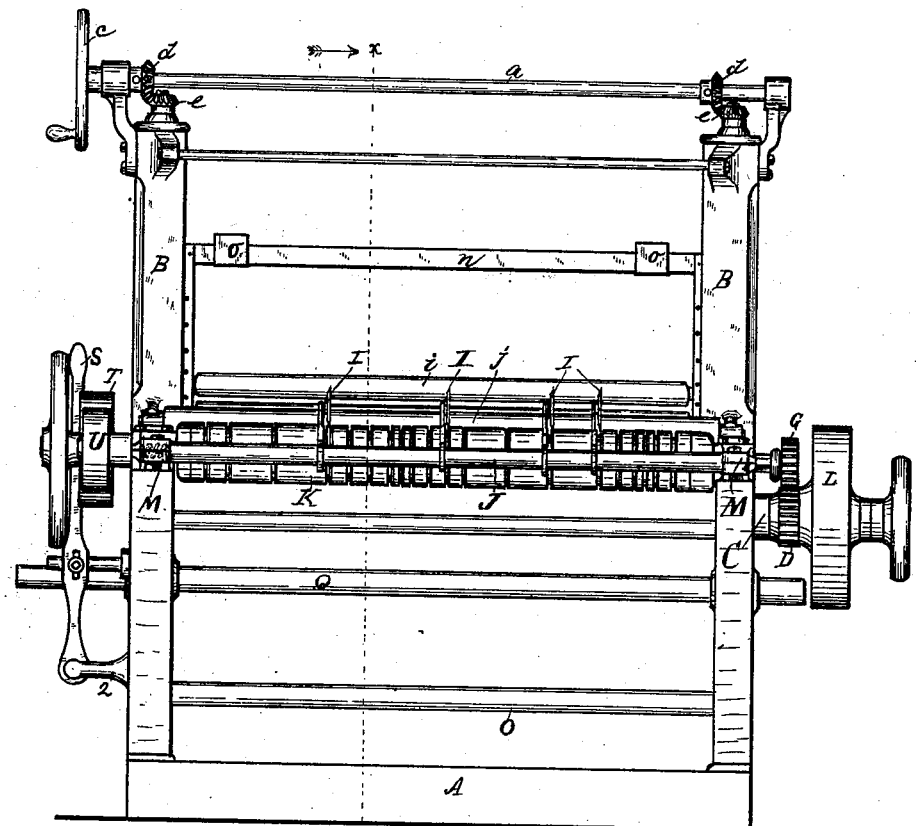
Figure 3:
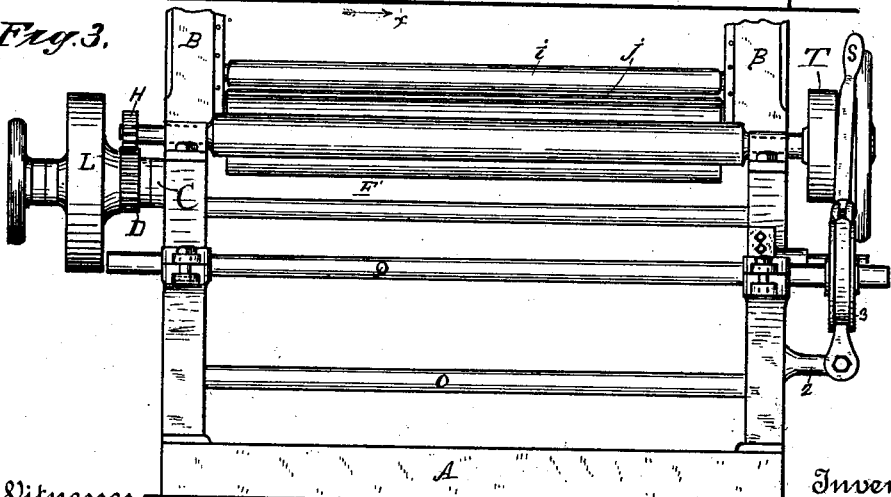
Figure 4:
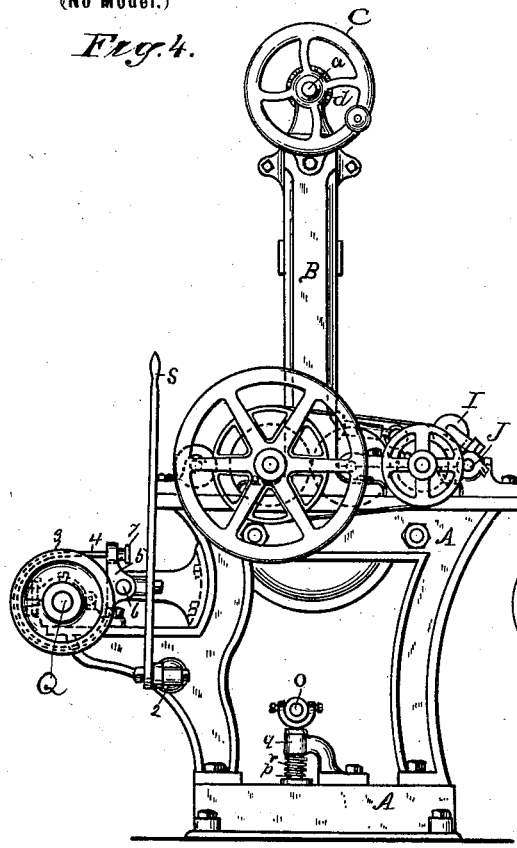
Figure 5:
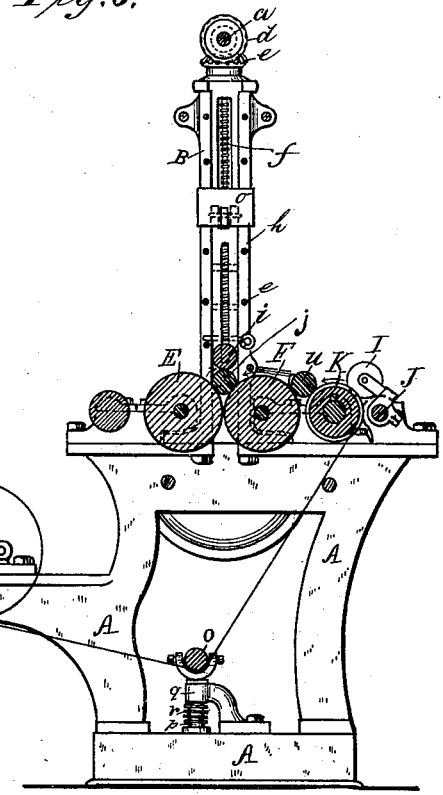
Figure 13:
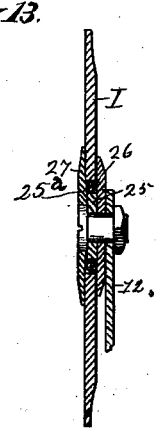
Figure 14:
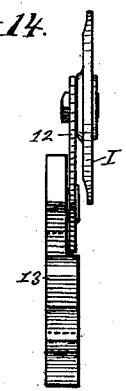
Figure 15:
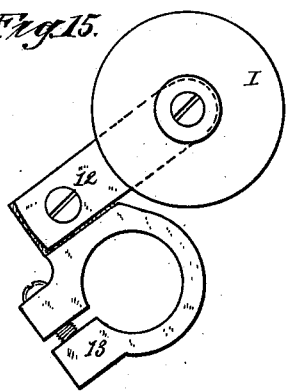

In the accompanying drawings, in which like letters and figures of reference indicate like parts, Figure 1 is a perspective of my improved machine. Fig. 2 is a front elevation. Fig. 3 is a rear elevation. Fig. 4 is an end view as seen from the left of Fig. 2. Fig. 5 is a sectional view taken on line X X of Fig. 2 and looking in the direction of the flight of the arrows, the direction of paper being herein indicated by full lines and arrows. Fig. 6 is a view, on an enlarged scale, of the upper part of my machine, shown partly in section. Fig. 7 is a view, on an enlarged scale, of the brake and shifting device as seen from the front. Fig. 8 is a side view of the same. Fig. 9 is an enlarged sectional view of the clutch mechanism. Fig. 10 is an enlarged sectional view of the boxes in which the cutting-knife shaft is journaled. Fig. 11 is an enlarged view of the feed tension-roll in the lower portion of the machine. Fig. 12 is an enlarged view of the tension-roll for holding the paper firmly to the cutting-roll while it is being cut, showing also its connections to the machine. Fig. 13 is an enlarged sectional view of a cutting-knife and holder. Fig. 14 is an enlarged front view of a cutting-knife and holder. Fig. 15 is a side view of the same.

In detail some of the principal parts are lettered and marked as follows:

A indicates the base of the machine; B, uprights; C, a stud on which the clutch-pulley mechanism is mounted; D, a gear; E and F, supporting-rolls; G and H, gears mounted on the supporting-roll shafts; I, rotary cutters; J, cutter-supporting rod; K, cutter-roll; L, clutch-pulley; M, bearings of cutter-supporting rod; O, lower guide-roll; Q, shaft on which the feed or supply roll is mounted; S, shaft-lever for the feed-roll; T and U, pulleys.

*a* indicates the shaft adapted to operate the lifting-screws; *c*, a hand-wheel mounted at one end of said shaft; *d*, beveled gears passing thereto over the top of the supporting-roll F and partially over roll E, so that the roll being formed rests upon the two rolls F and E, mounted upon the lifting-screws; *f*, lifting-screws; *g*, lifting-nuts; *h*, a frame mounted between the uprights B; *i*, pressure-roll; *j*, receiving-roll or roll upon which the material is wound.

The construction and operation of my machine may be described as follows:

A suitable frame A is provided, upon which are mounted guide-rolls, cutting-rolls, a pressure-roll, supporting-rolls, &c. The uprights B are mounted upon the top portion of the frame A, and lifting-screws *f* are mounted in said uprights.

The roll of paper or other material to be operated upon is mounted and supported upon the shaft Q, which shaft is suitably mounted in the back portion of the machine, its preferred location being most clearly shown in Figs. 4 and 5. Suitable brake mechanism, hereinafter described, is arranged for restraining the too-free revolution of the roll of material. The material is carried from the supply-roll downwardly under the guide-roll O, located in the lower portion of the machine, and from thence is carried upwardly over the cutter-roll K, thence under the guide-roll *u*, and from thence is wound upon the receiving-roll *j*, the cutting operation being performed while the material is passing over the cutter-roll K. The supporting-rolls E and F are preferably formed of wood, and the roll E has a diameter slightly in excess of the roll F, so that while the number of revolutions per minute is the same as that of the roll F its periphery travels faster, thus stretching and tightly winding the paper upon the receiving-roll.

The pressure-roll $i$ is mounted in a vertically-moving frame $h$, (shown most clearly in Fig. 6,) which frame is so constructed as to apply pressure upon the receiving-roll $j$ to the desired extent, which pressure may be regulated by the application of weights, as $o'$, mounted upon the cross-bar $n$ of this frame.

The pressure-roll $i$ is mounted with its ends projecting through slots in the movable frame $h$ and is free to be independently moved upwardly and away from the receiving-roll by the increasing size of the roll of material being formed.

The guide-roll O, (see Fig. 11,) located in the lower portion of the machine, is provided with bearings having stems $p$, which stems are mounted in supports $q$, and coil-springs $r$ are mounted upon the end portions of the stems, so that a cushioning effect is produced, and if, as frequently occurs in a web of paper or other material, one side has been stretched more than the other or the web is otherwise irregular this inequality will be compensated for by the yielding guide-roll O, thus avoiding the rupture of the material which might result were this guide-roll mounted in fixed or unyielding supports, and at the same time a substantially uniform tension is maintained upon the material whether it be uniform or not. The guide-roll $u$ (see Fig. 12) is also yieldingly mounted. The bearings 20 for the guide-roll $u$ are provided with stems 21, which enter sockets 22, the sockets being pivotally mounted upon lugs 23, which project from the face of the uprights B. The arrangement of the guide-roll $u$ between the cutter-roll K and the supporting-roll F serves to maintain the paper after it has been cut in a flat and uniform position, holding it taut and snugly down upon the supporting-roll until it reaches the roll upon which it is wound. In the cutting of paper into very narrow pieces this is found quite necessary, as the tendency at times is for some of the narrow strips of paper to twist or curl, and thus become diverged slightly from a direct line, thus tending to cause it to be wound in a somewhat-irregular manner, causing the narrow roll of paper afterward to present an uneven appearance wherever a strip of paper is wound thereon a trifling distance out of a direct line.

In order to maintain the material in proper alinement as it is wound from the roll, the supply-shaft Q is mounted so that it may be adjusted longitudinally and a lever S engages therewith, whereby the shaft may be moved to the desired position.

In order to prevent the too-free revolution of the supply-shaft, I provide a brake mechanism consisting of a grooved pulley 3, mounted upon the supply-shaft, and a strap 4 passes around the brake-pulley 3, one end of which strap is fixed to an adjusting-screw 7, so that the freedom with which the supply-shaft revolves may be controlled by increasing or decreasing the friction upon the brake-pulley by means of the adjusting mechanism.

A most convenient means for engagement between the shaft and the lever for moving it longitudinally is, in my judgment, that illustrated in Figs. 7 and 8, in which I show a supporting-stud 30 mounted upon the lever S, and upon said stud the strap-supporting frame 50 is secured, so that by this construction I utilize the brake mechanism as a means of connection between the lever and the shaft. While this means of connection may seem to be somewhat flexible and difficult to operate while the machine is at rest, it will readily be seen that while the feed-roll shaft is revolving a slight pressure or strain, tending to carry the shaft in either direction, will operate to move it in that direction, and the lever employed in moving the shaft is only put in operation ordinarily while the feed-roll shaft is revolving. If desired, the brake-strap-supporting piece 50 may be made to project into the groove of the pulley 3, and thus furnish a more positive means of moving the feed-roll shaft longitudinally when required to bring the paper in proper alinement.

The rotary cutters I are mounted upon spring-supports 12, which in turn are mounted upon adjustable supporting-collars 13, and these collars are adjustably mounted upon the cutter-rod J, and a spring X is arranged which continually forces the rod J in one direction, while for the purpose of carrying this rod in the opposite direction a screw 24, having a hand-wheel $w$, is provided, the screw being arranged to project through the bearing and bear against the end of the rod J. This arrangement of parts enables me to properly adjust the rod longitudinally and insures a continual shearing contact between the cutting edges and avoids danger of breaking or injuring the cutters and also enables me to move all of the cutters in unison, so as to bring the cutting edges together or to separate them simultaneously. The spring is arranged to force the rod J in a direction to carry the cutters against the cutting-disks of roll K, thus maintaining the cutting edges in contact by a spring-pressure. When it is desired to separate all the cutting edges at once, the hand-wheel at the end of the shaft opposite the spring is turned, thus revolving the threaded rod to which it is attached and forcing the cutter-supporting rod J against the spring and moving the cutters laterally away from the cutting-disks of the roll K.

The cutter-roll K is constructed by the employment of hardened-steel disks mounted upon a shaft, these disks or rings being preferably held in fixed position against movement longitudinally on the shaft by intervening collars or rings.

By the arrangement and construction herein shown it will be seen that each cutter may be readily adjusted so that the sharpened cutting edge will lie against the face of the hardened-steel disk or ring, this individual adjustment being accomplished by adjusting the split ring or collar 13 upon the supporting-rod J, and each spring-support 12 mounted upon its split ring. A support 13 will at all times tend to force its individual cutter in the desired direction, while all of the cutters may, as before stated, be simultaneously adjusted longitudinally by moving the rod J, and the cutters may all be moved toward or from the roll K by rotating the supporting-rod J, moving the attached supports 12, mounted on the collars or split rings 13 and carrying the cutters to the desired position.

The cutters I have large central openings and are mounted upon ball-bearings, the balls 25ª traversing the periphery of a central part 25 and collars 26 and 27 being arranged upon each side, this preventing the escape of the balls and at the same time insuring a free and frictionless revolution of the cutting-blade upon its support.

It will readily be seen that while it is more convenient to mount a ring or part 25 upon the supporting-stud than to provide a stud having a hardened surface the same result will be accomplished if the balls traverse the stud itself instead of the ring 25, mounted upon the stud, and I do not limit myself to the arrangement of a ring mounted upon the stud, although I deem this method of construction most convenient, and in this connection I deem the stud with a straight body and a stud with an enlargement thereon either formed integral therewith or independently and mounted thereon equivalents.

The lifting-screws $f$ are mounted, as before stated, in the uprights B, and the nuts $g$ are threaded to engage the thread on the screws $f$, and these nuts are provided with offsets or lugs 28, which project through the slotted openings in the inner faces of the uprights B, so as to rest under the ends of the pressure-roll $i$. When, therefore, these screws are turned in a direction to carry the nuts $g$ downwardly a sufficient distance, the pressure-roll $i$ will rest against the receiving-roll $j$ or against the material wound thereon, while if these screws are turned in the opposite direction the nuts $g$ will be carried upwardly, and their lugs, resting under the ends of the pressure-roll $i$, will engage the roll at the ends and carry it upwardly also, and if it be desired to remove the weight from the receiving-roll $j$ then pins may be inserted through the opening $e$ in the frame $h$, thus preventing the further upward movement of the pressure-roll $i$ in the frame $h$, and the further upward movement of the nuts $g$ will result in moving the frame and pressure-roll together from the receiving-roll, thus relieving the receiving-roll $j$ from pressure and also moving the frame out of the way, so that the receiving-roll, with the material wound thereon, may be removed from the machine.

For purposes of illustration I have chosen to use the mechanism composed of a screw and nut regulated by bevel-gears for vertically adjusting the pressure-roll and frame $h$. I do not intend, however, to confine myself to this particular mechanism, as it will readily be seen that the same result may be attained by the employment of other mechanical appliances arranged for lifting the parts.

When the winding operation is begun, the paper or other material is wrapped around the receiving-roll $j$, the frame $h$ and pressure-roll $i$ lowered to place, and the lifting-screws turned slightly, so as to allow the pressure-roll to bear and rest upon the material wound upon the receiving-roll, and if great compactness is desired then weights $o$ may be placed on the cross-beam $n$ of the frame $h$, thus bearing the receiving-roll $j$ downwardly upon the supporting-rolls E and F with great force, and the material is further subjected to pressure as it passes below the pressure-roll $i$.

To insure uniformity in the revolution of the lifting-screws and to render them easy to manipulate, beveled gears $e$ are mounted upon their upper ends, and like gears meshing therewith are mounted upon the lifting-shaft $a$, and a hand-wheel is provided at one end of the shaft $a$, so that the same may be conveniently revolved. Thus it will be seen that a revolution of the shaft $a$ will cause the gears $e$ to revolve by reason of the gears $d$ meshing therewith, and thus the lifting-screws $f$ will be revolved in the desired direction.

Motion is imparted to the various parts of the machine by the employment of gear D being mounted upon the part 10 of the clutch and these together being mounted upon a stud C, suitably secured to the frame. A clutch-pulley is mounted also on the stud C and provided with engaging friction-faces to engage the part 10. A hand-wheel W is mounted upon the threaded end of the stud C, and upon its being turned in one direction the clutch-pulley is moved forwardly and caused to engage with the opposite friction-surface, while if it is turned in the opposite direction the clutch-pulley is free to revolve independently.

To avoid friction between the fixed and moving parts, I provide ball-bearings, as shown at $w$ in Fig. 9.

The gear H is mounted upon the end of the shaft on which the supporting-roll F is mounted, and its teeth mesh with the teeth of the gear D, while a like gear mounted upon the shaft upon which the roll E is mounted meshes with the same gear.

By the employment of the clutch mechanism described the machine may be started or stopped instantly or gradually by properly manipulating the hand-wheel W, while the portion of clutch-pulley on which the driving-belt is mounted continues to revolve at a given speed.

It will of course be seen that this machine may be employed for closely winding paper or other material without cutting or slitting and that the cutting or slitting mechanism may be employed without the employment of the mechanism for closely rolling or winding.

Having therefore described my invention, what I claim, and desire to secure by Letters Patent, is—

1. The combination of a supply-roll-supporting shaft, adapted to be adjusted longitudinally, a lever pivotally mounted adjacent to said shaft and operatively connected therewith and adapted to move the shaft longitudinally and a brake adapted to restrain too free revolution of the shaft, the brake being mounted on said lever.

2. The combination of a supply-roll-supporting shaft, a brake mechanism comprising a grooved pulley, a strap mounted therein and attached to a stud, the stud being mounted on a lever, said lever being pivoted to move in a line parallel with the pulley-axis and means to vary the pressure upon the brake-strap, substantially as shown.

3. The combination of a supply-roll-supporting shaft, a brake mechanism, a strap arranged to pass around the brake-wheel, a support to which one end of the strap is attached, and an adjustable screw 51 attached to the opposite end of the strap, and arranged to pass through a suitable fixed support 50, an adjusting-nut 7 mounted on the screw and a lever with said stud and support mounted thereon, substantially as shown.

4. The combination of a suitable frame, a guide-roll, bearings provided with stems $p$, supports $q$ for said stems, and springs $r$ below the bearing and below the overhang of the supports to hold the stems in one position normally while permitting them to be moved upwardly under strain, substantially as shown.

5. The combination of a suitable frame, supporting-rolls mounted in said frame, a guide-roll $u$ mounted in the bearings 20 having the stems 21, and the sockets 22 pivotally mounted to the frame-lugs 23, said stems being received by said sockets, substantially as shown.

6. The combination of two supporting-rolls, operative mechanism to revolve both said rolls at the same speed, one of said rolls being of a larger diameter than the other, and a receiving-roll arranged to be supported by the supporting-rolls, substantially as shown.

7. The combination of a suitable frame, two supporting-rolls suitably mounted therein, a receiving-roll arranged to be supported by the supporting-rolls, a pressure-roll arranged to bear upon the roll of material as it is being formed, a vertical movable frame bearing upon the pressure-roll, means to apply pressure upon the pressure-roll through the medium of said frame, and mechanism for raising and lowering said frame, independently of the receiving-roll.

8. The combination of a receiving-roll suitably supported, a roll $i$ arranged to move vertically in a frame, the latter having means to support weights, weights mounted on said frame, and mechanism for moving the frame.

9. The combination of a suitable frame, a receiving-roll, suitable lifting-screws, nuts mounted on the screws, a gravity pressure-roll; the ends of which are arranged to engage the nuts and means to rotate the lifting-screws, substantially as shown.

10. The combination of a suitable frame, a receiving-roll, uprights mounted on the frame, a frame $h$ mounted upon the uprights B and arranged to impart pressure to the receiving-roll, the pressure-roll being mounted to bear upon the material being wound upon the receiving-roll and free to be moved away from the receiving-roll without moving the frame $h$, lifting-screws mounted in the uprights B, nuts mounted on the screws and arranged to engage the pressure-roll and means to lock the pressure-roll to the frame $h$ whereby the pressure-roll may be lifted independently, but when locked to the frame $h$ the roll and frame may be lifted together, substantially as and for the purposes stated.

11. The combination of a suitable frame, a receiving-roll, suitably mounted therein, uprights B, lifting-screws $f$ mounted in the uprights B and having gears mounted on their outer ends, a shaft as $a$ mounted in suitable bearings, gears mounted on the shaft $a$ to mesh with the gears on the lifting-screws, a pressure-roll mounted in the uprights B and nuts mounted on the screws and arranged to engage and lift the pressure-roll when desired, substantially as shown.

12. The combination in a slitting-machine of a suitable frame, a suitable guide-roll, a receiving-roll, a series of disks against the sides of which the cutters bear, a series of cutter-supports adjustably mounted, a series of springs mounted on said supports and cutters mounted on said springs, the said springs being adapted to yield laterally and cause the face of the cutters to at all times bear against the face of the disks, substantially as and for the purposes stated.

13. The combination in a slitting-machine of a suitable frame, suitable guide-rolls, suitable supply and receiving rolls, a cutter-supporting rod, adjustable collars mounted thereon, a cutter supporting resilient or spring pieces mounted on the adjustable collars in such a manner as to allow of lateral motion and cutters mounted directly on the resilient pieces, substantially as shown.

14. The combination in a slitting-machine of a suitable frame, suitable guide-rolls, suitable supply and receiving rolls, a flexible independent cutter-supporting piece 12 mounted on adjustable split collar 13 in such a manner as to allow of lateral motion, and cutters mounted on the cutter-supporting piece, substantially as shown.

15. The combination in a slitting-machine of a suitable frame, suitable guide-rolls, suitable supply and receiving rolls, a cutter-supporting rod, adjustable split collars mounted thereon, springs 12 mounted on the latter and cutters mounted on the springs 12, substantially as shown.

16. The combination in a machine of the character described, of a suitable frame, suitable guide-rolls, suitable supply and receiving rolls, and two supporting-rolls, a clutch-pulley suitably mounted on the frame, a gear arranged to be rotated by the clutch-pulley when in engagement and gears mounted upon the shafts of the supporting-rolls and intermeshing with the clutch-gear, substantially as shown.

17. The combination in a slitting-machine of a cutter-supporting rod, movable longitudinally, a series of split collars mounted on said rod, a series of arms mounted on said collars, cutters mounted on said arms, a series of disks for the cutter to shear against, a spring arranged to force the cutter-supporting rod in a direction to cause the cutters to bear laterally against the disks, and means to move said rod longitudinally against the spring and thereby carry the cutters laterally away from the disks, substantially as shown.

CHARLES KOEGEL.

Witnesses:
ALLEN WEBSTER,
S. L. SWEENEY.